(12) United States Patent
Steinmann et al.

(10) Patent No.: US 11,498,416 B2
(45) Date of Patent: Nov. 15, 2022

(54) FUEL TANK COMPRISING A CONNECTOR PIECE

(71) Applicant: MAGNA Energy Storage Systems GesmbH, Sinabelkirchen (AT)

(72) Inventors: Dominik Steinmann, Stubenberg (AT); Stefan Fuchs, Graz (AT)

(73) Assignee: MAGNA Energy Storage Systems GesmbH, Sinabelkirchen (AT)

( * ) Notice: Subject to any disclaimer, the term of this patent is extended or adjusted under 35 U.S.C. 154(b) by 212 days.

(21) Appl. No.: 17/122,624

(22) Filed: Dec. 15, 2020

(65) Prior Publication Data
US 2021/0221222 A1 Jul. 22, 2021

(30) Foreign Application Priority Data
Jan. 21, 2020 (EP) ..................................... 20152870

(51) Int. Cl.
  *B60K 15/04* (2006.01)
  *F16L 33/22* (2006.01)
  *F16L 37/088* (2006.01)

(52) U.S. Cl.
  CPC .............. *B60K 15/04* (2013.01); *F16L 33/22* (2013.01); *F16L 37/088* (2013.01); *B60K 2015/0458* (2013.01)

(58) Field of Classification Search
  CPC . B60K 15/04; B60K 2015/0458; F16L 33/22; F16L 37/088
  USPC ....................................................... 220/86.2
  See application file for complete search history.

(56) References Cited

U.S. PATENT DOCUMENTS

| | | | | |
|---|---|---|---|---|
| 3,922,011 A | * | 11/1975 | Walters .................. | F16L 37/088 285/902 |
| 4,730,652 A | * | 3/1988 | Bartholomew ........ | G05G 5/005 285/80 |
| 5,413,386 A | * | 5/1995 | Dal Palu ............. | F16L 37/0985 285/123.1 |
| 2003/0173776 A1 | | 9/2003 | Morohoshi et al. | |

(Continued)

FOREIGN PATENT DOCUMENTS

| | | |
|---|---|---|
| DE | 69213044 T2 | 2/1997 |
| DE | 10100128 A1 | 8/2001 |
| DE | 102016223634 A1 | 5/2018 |

*Primary Examiner* — J. Gregory Pickett
*Assistant Examiner* — Niki M Eloshway
(74) *Attorney, Agent, or Firm* — Jordan IP Law, LLC; Todd A. Vaughn

(57) ABSTRACT

A fuel tank that includes a fuel container, a filler pipe, a connecting piece member, and an annular locking element. The connecting piece member is configured to connect the filler pipe to the fuel container, and is a substantially cylindrical sheet metal shaped cross-section having a first connecting end for fastening to a first component to be connected, and a second connecting end for receipt in a second component to be connected. The second connecting end has a first portion with a first groove shaped therein. The annular locking element extends at least partially through openings of the second component to be connected at a connection point into an interior of the second component to be connected, and at the connection point, axially secures the second component to be connected relative to the connecting piece member by a positive connection on the first groove.

16 Claims, 2 Drawing Sheets

(56) References Cited

U.S. PATENT DOCUMENTS

| | | | |
|---|---|---|---|
| 2011/0259447 A1* | 10/2011 | Ishizaka | B60K 15/04 |
| | | | 137/511 |
| 2013/0127159 A1* | 5/2013 | Honda | B60K 15/04 |
| | | | 285/305 |
| 2014/0284329 A1* | 9/2014 | Frank | B60K 15/03006 |
| | | | 220/86.2 |
| 2017/0021723 A1* | 1/2017 | Visarius | B60K 15/04 |
| 2017/0051856 A1* | 2/2017 | Krezer | F16L 25/01 |
| 2019/0242508 A1* | 8/2019 | Gaurat | F16L 37/088 |
| 2020/0309299 A1* | 10/2020 | Williams | F16L 37/0927 |

* cited by examiner

FUEL TANK COMPRISING A CONNECTOR PIECE

CROSS-REFERENCE TO RELATED APPLICATIONS

The present application claims priority 35 U.S.C. § 119 to European Patent Publication No. EP 20152870.0 (filed on Jan. 21, 2020), which is hereby incorporated by reference in its entirety.

TECHNICAL FIELD

One or more embodiments relate to a fuel tank comprising a fuel container, a filler pipe, and a connecting piece member for connecting the filler pipe to the fuel container.

BACKGROUND

Motor vehicles use fuel containers for carrying the necessary fuel. In order to fill the fuel container, such a fuel container generally has a filler pipe.

In recent times attempts have been made to produce both the fuel container and the filler neck from materials which are different from steel, for example, in particular in order to save weight and costs. Additionally, in the meantime strict requirements have also been set relative to low emissions for tank systems. Thus, for example, filler pipes which comprise plastics hoses are used, wherein the filler pipes and/or the plastics hoses thereof may have a barrier layer for reducing hydrocarbon emissions.

In modern tank systems, in particular of hybrid construction, it is particularly difficult to design the connection between the filler pipe and the fuel container to be low in terms of emissions, to be of low weight and yet to be cost-effective.

SUMMARY

One or more embodiments relate to an improved fuel tank comprising a fuel container and a filler pipe and, in particular, a fuel tank which may be produced to be low in terms of emissions, to be of low weight, and yet to be cost-effective.

The object is achieved by a fuel tank comprising a fuel container, a filler pipe and a connecting piece member for connecting the filler pipe to the fuel container, wherein the connecting piece member is a substantially cylindrical sheet metal shaped part with a first connecting end which is fastened to the first component to be connected, namely to the filler pipe or to a connection part of the fuel container, and a male second connecting end which is received in the other component to be connected, namely in the connection part of the fuel container or in the filler pipe, wherein a first groove is shaped in the sheet metal shaped part in a first portion of the second connecting end, wherein an annular locking element extends at least partially through openings of the other component to be connected into the interior of the other component to be connected and at that point axially secures the other component to be connected relative to the connecting piece member by a support, in particular by a positive connection, on the first groove of the connecting piece member.

In accordance with one or more embodiments, a connecting piece member is used in order to connect a filler pipe to a fuel container.

The connecting piece member is cylindrical and is designed as a male connecting part on at least one end, namely the second connecting end. The connecting piece member is fastened at a first end to the first component to be connected, for example to the filler pipe, for example is arranged radially inside the filler pipe, and at a second end, namely the second connecting end, is arranged radially inside the other component to be connected, in particular, inside a similarly cylindrical connection part of the fuel container, for example in a connection nipple of the fuel container.

In accordance with one or more embodiments, the connecting piece member is designed as a sheet metal shaped part. Such a sheet metal shaped part is substantially more cost-effective in terms of production and also has a lower weight than, for example, a turned part. According to the invention, it has been established that the plasticity of a simple sheet metal shaped part is sufficient in order to be able to produce the required properties of a connecting part between the filler neck and the fuel container, in particular in terms of the seal and a secure axial seat, even when using a rapid coupling mechanism with a locking element.

In order to produce an axial securing of the connecting piece member on the fuel container, a first groove is shaped in the connecting piece member. An annular locking element, which in principle circulates radially outside the connection part but at least partially extends through openings of the connection part of the fuel container into the interior of the connection part, in particular a securing spring, axially secures the other component to be connected and the connecting piece member relative to one another via a positive connection. In order to achieve the axial securing, the first groove which is shaped in the sheet metal shaped part is used directly or indirectly. The locking element may be supported by itself, or via an intermediate component, on the first groove. The connection via the locking element may be releasable in a simple manner. The second connecting end of the connecting piece member, therefore, may form one side of a rapid coupling mechanism.

In accordance with one or more embodiments, the first connecting end is also designed to be male, so that the first connecting end is radially internally received in the first component to be connected.

In accordance with one or more embodiments, the first component to be connected is the filler pipe, for example a connection portion of the filler pipe, and the other component to be connected is the connection part of the fuel container.

In accordance with one or more embodiments, the filler pipe comprises a hose, in particular a plastics hose, wherein the hose is pushed onto the first connecting end of the connecting piece member. The filler pipe, in particular the hose, may also be fastened to the second connecting end of the connecting piece member via a rapid coupling mechanism. The hose may form one end of the filler pipe. The term "filler pipe", therefore, may encompass a rigid pipe part and may encompass a flexible hose part.

In accordance with one or more embodiments, a hose clamp is arranged externally on the hose, for example axially in the region of the first connecting end, so that the hose is clamped between the hose clamp and the connecting piece member.

In accordance with one or more embodiments, a hose connector which has a peripheral insertion chamfer is also configured on the axial end of the connecting piece member to which the filler pipe is fastened, in order to facilitate pushing on the hose, wherein the insertion chamfer may transition into a radially outwardly protruding peripheral retaining lug.

The first connecting end may be arranged, in particular, pushed, inside a plastics filler pipe, in particular inside a rigid pipe of a filler pipe. In the case of metal filler pipes, this connecting end may also be attached to the filler pipe via welding or soldering.

The first connecting end may be designed, therefore, such that it is capable of being pushed into a plastics filler pipe. The first connecting end may have, in particular, a fir tree geometry. The first connecting end may also be designed such that it may be welded or soldered to a metal filler pipe.

A peripheral seal is preferably arranged between the connecting piece member and the other component to be connected in a second portion of the second connecting end, wherein the peripheral seal is preferably located in a second groove of the connecting piece member. The peripheral seal may be, in particular, an annular seal.

Preferably a ramp ring is arranged in a third portion of the second connecting end, wherein the ramp ring is a peripheral component with a wedge-shaped ramp surface, wherein a conical portion of the other component to be connected bears externally against the wedge-shaped ramp surface of the ramp ring.

In accordance with one or more embodiments, the ramp ring may be axially secured in the first groove. The first groove may be a radially inwardly shaped groove. Alternatively, the first groove may also be shaped by two defining, outwardly protruding corrugations. In this case, the ramp ring is preferably axially secured on one of the two defining corrugations.

In accordance with one or more embodiments, the support, in particular, the positive connection to the first groove for axially securing the connecting piece member, may be produced directly by the annular locking element or even indirectly via an intermediate part, for example when using the ramp ring as the intermediate part.

In accordance with one or more embodiments, the connection part preferably consists of metal.

In the region of the second connecting end of the connecting piece member, preferably a grounding tab is configured between the connecting piece member and the connection part, so that an electrically conductive contact is present between the connecting piece member and the connection part. The grounding tab may preferably be located in the same third portion of the second connecting end in which the ramp ring is also arranged. The grounding tab may also be formed by the ramp ring.

DRAWINGS

One or more embodiments will be illustrated by way of example in the drawings and explained in the description hereinbelow.

DESCRIPTION

Figure 1:
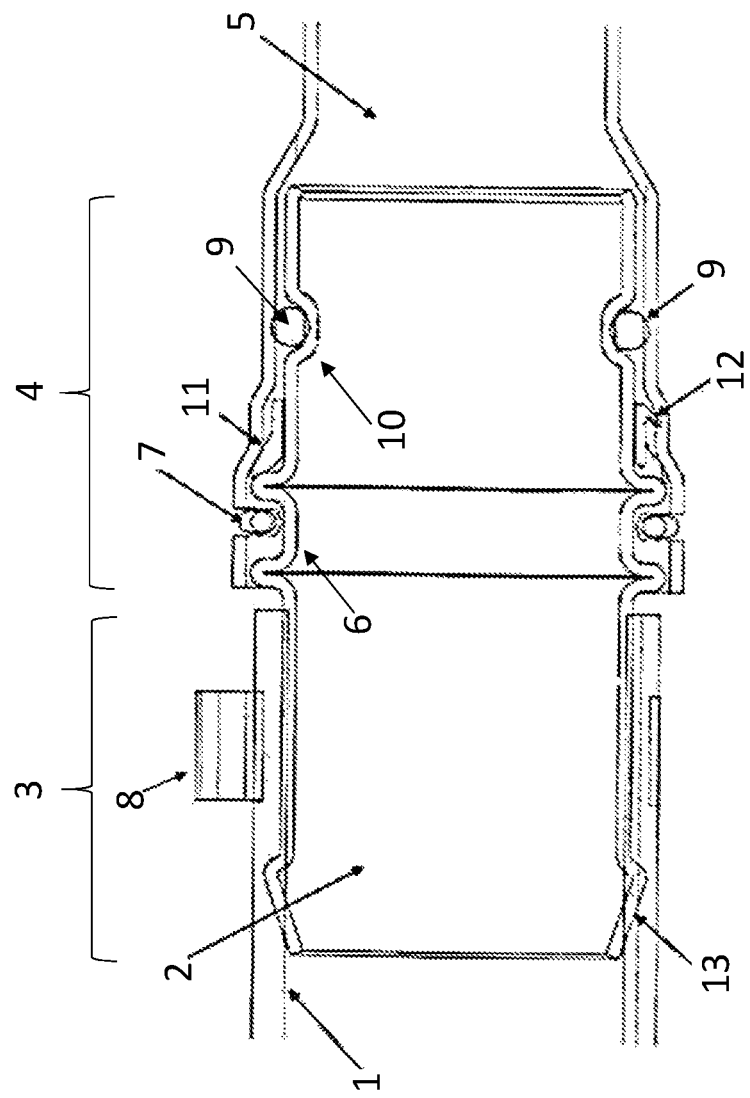
FIG. 1 illustrates a schematic sectional view of a fuel tank in the region of the connecting piece member, in accordance with a first embodiment.

In accordance with a first embodiment, a fuel tank is illustrated in FIG. 1 in the region of the connecting piece member between the filler pipe and the fuel container. The fuel tank comprises a fuel container (not illustrated), with a substantially cylindrical connection part 5 of the fuel container, for example, a connection nipple, as the other component to be connected. The fuel container and/or the connection part 5 comprises a metal. The fuel container and/or the connection part 5, however, could also comprise of a plastic material.

A filler pipe 1 made of plastics, as the first component to be connected, is connected via the connecting piece member 2 to the connection part 5 of the fuel container. Alternatively, for example, a filler pipe made of a metal could also be used.

The connecting piece member 2 is a substantially cylindrical sheet metal shaped part which is designed at both ends in the manner of a male plug connection. The connecting piece member 2 has a first male connecting end 3 onto which a hose of the filler pipe 1 is plugged and a second male connecting end 4 which is inserted in a connection part 5 of the fuel container.

The first connecting end 3 and the second connecting end 4 together extend virtually over the entire length of the connecting piece member.

The filler pipe 1 preferably comprises a plastic or a metal. Particularly, the filler pipe 1 has a hose as an end portion, wherein the hose comprises a plastic material. The filler pipe 1, in particular the hose, is pushed onto the first connecting end 3 of the connecting piece member 2.

A hose clamp 8 is arranged externally on the hose, axially in the region of the first connecting end 3, so that the hose is clamped between the hose clamp 8 and the connecting piece member 2. A hose connector 13 is configured at the axial end of the first connecting end 3 of the connecting piece member 2. The hose connector 13 comprises a peripheral insertion chamfer in order to facilitate pushing on the hose of the filler pipe 1. The insertion chamfer also forms a radially outwardly protruding peripheral retaining lug for improved retention of the filler pipe 1.

A first groove 6 is shaped in the sheet metal shaped part, i.e., the connecting piece member 2, in a first portion of the second connecting end 4. In the embodiment of FIG. 1 this first groove 6 is shaped by two defining, outwardly protruding corrugations.

Figure 2:
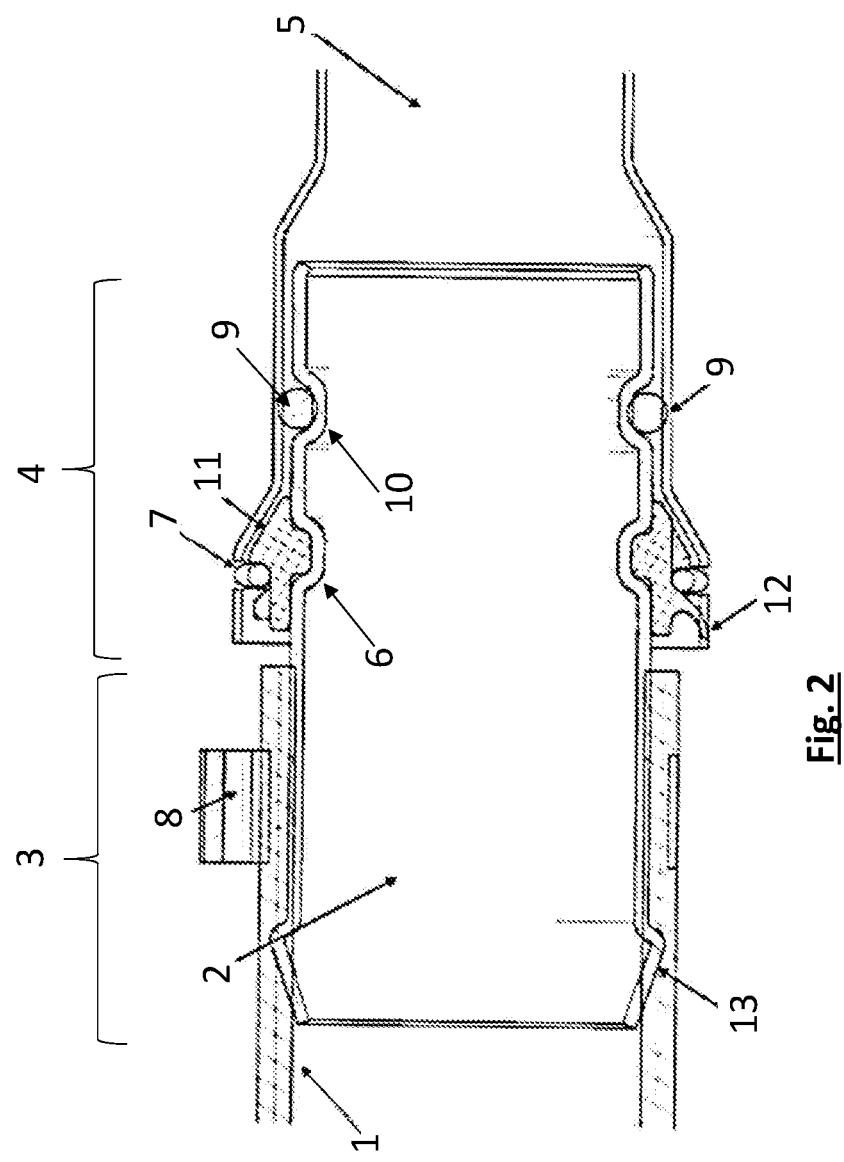
FIG. 2 illustrates a schematic sectional view of a fuel tank in the region of the connecting piece member, in accordance with a first embodiment.

An annular locking element 7 extends at least partially through a plurality of openings, in particular, slots, of the connection part 5 of the fuel container into the interior of the connection part 5. Via the locking element 7, the connection part 5 is axially secured via a positive connection to the first groove 6 of the connecting piece member 2 at least in one direction. The locking element 7 may, for example, additionally be directly supported on the walls or at least one wall of the groove 6, as illustrated in FIG. 1. The locking element 7 may, however, also be supported on an intermediate component which in turn is axially secured by the first groove 6 and/or the walls of the first groove 6, for example, by a component which additionally forms a ramp for the plugged-on connection part 5, namely a ramp ring 11, as illustrated in FIG. 2.

A ramp ring 11 is arranged in a third portion of the second connecting end 4, which may be different from the first portion with the first groove 6 but may also partially or entirely coincide with the first portion. The ramp ring 11 is a peripheral component around the periphery of the connecting piece member, with a wedge-shaped ramp surface facing the fuel container, wherein a conical portion of the connection part 5 bears externally against the wedge-shaped ramp surface of the ramp ring 11.

The ramp ring 11 may be axially secured in or on the first groove 6. In the embodiment of FIG. 1, the ramp ring 11 bears against a corrugation, i.e., against a wall of the first groove 6. In the embodiment of FIG. 2, the ramp ring 11 is partially located in the first groove 6.

When the connection part 5 is plugged on, the ramp of the ramp ring 11 is located upstream of the locking device implemented via the locking element 7. The connecting piece member 2 is prevented by the locking element 7 from being pulled off the connection part 5.

In a second portion of the second connecting end 4 which may differ from the first and third portion, a peripheral seal 9, in particular, an annular seal is arranged between the connecting piece member 2 and the connection part 5. The peripheral seal 9 is located in a second groove 10 of the connecting piece member 2 and is also axially secured thereby.

In the region of the second connecting end 4 of the connecting piece member 2, an grounding tab 12 is additionally configured between the connecting piece member 2 and the connection part 5, so that an electrically conductive contact is present between the connecting piece member 2 and the connection part 5. The grounding tab 12 may be located in the same portion of the second connecting end 4 in which the ramp ring 11 is also arranged.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS

1 Filler pipe
2 Connecting piece member
3 First connecting end
4 Second connecting end
5 Connection part of fuel container
6 First groove
7 Locking element
8 Hose clamp
9 Seal
10 Second groove
11 Ramp ring
12 Grounding tab
13 Hose connector

What is claimed is:

1. A fuel tank, comprising:
a fuel container;
a filler pipe; and
a connecting piece member, configured to connect the filler pipe to the fuel container, the connecting piece member comprising a substantially cylindrical sheet metal shaped cross-section having a first connecting end configured for fastening to a first component to be connected, and a second connecting end that comprises a male connector configured for receipt in a second component to be connected, the second connecting end having a first portion with a first groove shaped therein;
an annular locking element extending at least partially through openings of the second component to be connected at a connection point into an interior of the second component to be connected, and at the connection point, to axially secure the second component to be connected relative to the connecting piece member by a positive connection on the first groove; and
a ramp ring, arranged in a third portion of the second connecting end and axially secured in or on the first groove, the ramp ring including a peripheral component having a wedge-shaped ramp surface which is engaged by a conical portion of the second component to be connected.

2. The fuel tank of claim 1, wherein the first connecting end comprises a male connector for receipt in the filler pipe or the connection part of the fuel container.

3. The fuel tank of claim 1, wherein:
the first component to be connected comprises the filler pipe, and
the second component to be connected comprises a connection part of the fuel container.

4. The fuel tank of claim 1, wherein the filler pipe comprises a hose that is configured for connection to the first connecting end or the second connecting end of the connecting piece member.

5. The fuel tank of claim 4, further comprising a hose clamp, arranged externally on the hose, to clamp the hose between the hose clamp and the connecting piece member.

6. The fuel tank of claim 1, further comprising a peripheral seal, located in in a second groove of the connecting piece member and arranged between the connecting piece member and the second component to be connected in a second portion of the second connecting end.

7. The fuel tank of claim 1, wherein the first groove is shaped by two defining, outwardly protruding corrugations.

8. The fuel tank of claim 7, wherein the ramp ring is axially secured on one of the two defining corrugations.

9. The fuel tank of claim 1, wherein the connection part comprises a metal.

10. A fuel tank, comprising:
a fuel container having a connection part;
a filler pipe; and
a connecting piece member, configured to connect the filler pipe to the fuel container, the connecting piece member having a first connecting end configured for fastening to the filler pipe, and a second connecting end configured for receipt in the connection part of the fuel container, the second connecting end having a first portion with a first groove shaped therein;
a locking element extending at least partially through openings of the connection part of the fuel container and into an interior of the connection part of the fuel container, to thereby axially secure the connection part of the fuel container relative to the connecting piece member by a positive connection on the first groove; and
a ramp ring, arranged in a third portion of the second connecting end of the connection piece member and axially secured in or on the first groove, the ramp ring comprising a peripheral component having a wedge-shaped ramp surface which is engaged by a conical portion of the connection part of the fuel container.

11. The fuel tank of claim 10, wherein the first connecting end of the connection piece member comprises a male connector for receipt in the filler pipe.

12. The fuel tank of claim 10, wherein the filler pipe comprises a hose that is configured for connection to the first connecting end of the connection piece member.

13. The fuel tank of claim 12, further comprising a hose clamp, arranged externally on the hose, to clamp the hose between the hose clamp and the connecting piece member.

14. The fuel tank of claim 10, further comprising a peripheral seal, located in in a second groove of the connecting piece member and arranged between the connecting piece member and the connection part of the fuel container in a second portion of the second connecting end of the connection piece member.

15. The fuel tank of claim 10, wherein:
the first groove is shaped by two defining, outwardly protruding corrugations, and
the ramp ring is axially secured on one of the two defining corrugations.

16. A fuel tank, comprising:
a fuel container;
a filler pipe; and
a connecting piece member, configured to connect the filler pipe to the fuel container, the connecting piece member having a first connecting end configured for fastening to the filler pipe, and a second connecting end configured for receipt in the fuel container, the second connecting end having a first portion with a first groove shaped therein by two defining, outwardly protruding corrugations;
a locking element extending at least partially through openings of the fuel container and into an interior of the fuel container, to thereby axially secure the fuel container relative to the connecting piece member by a positive connection on the first groove; and
a ramp ring, arranged in a third portion of the second connecting end of the connection piece member and axially secured by one of the two defining outwardly protruding corrugations, the ramp ring comprising a peripheral component having a wedge-shaped ramp surface which is engaged by a conical portion of the connection part of the fuel container.

\* \* \* \* \*